March 5, 1935. R. V. LABARRE 1,993,103
SOIL TESTING APPARATUS
Filed Feb. 29, 1932 4 Sheets-Sheet 1

INVENTOR:
Robert V. La barre
By
ATTORNEY.

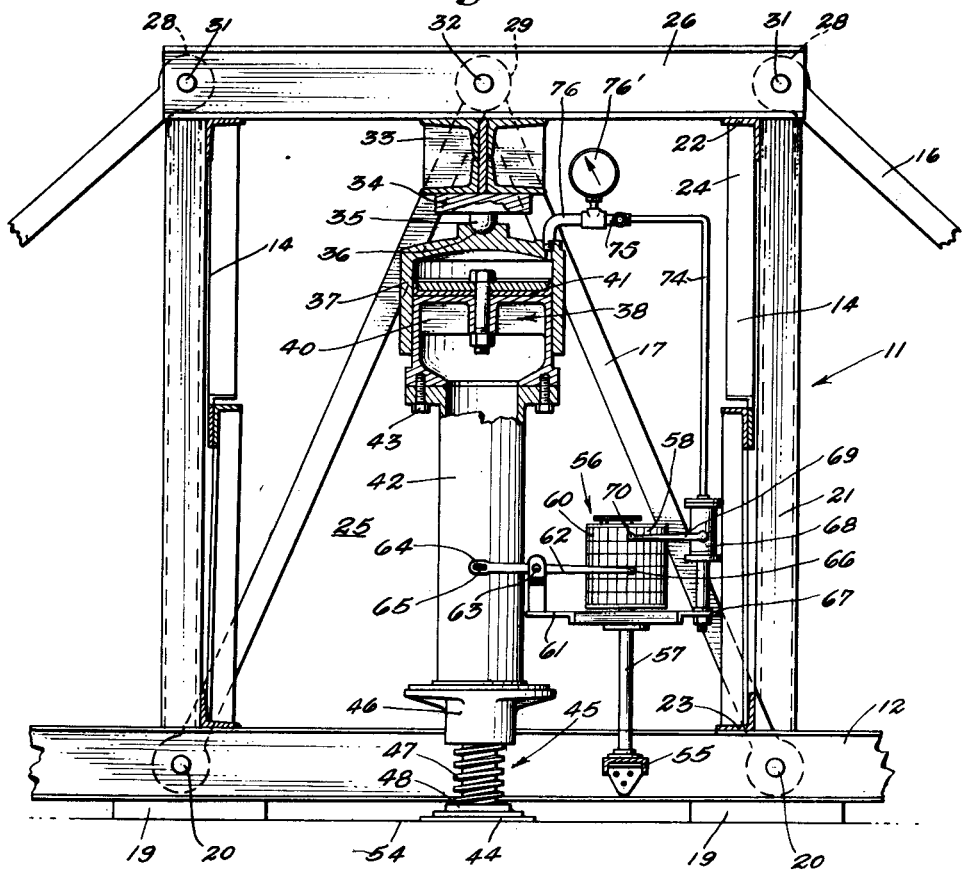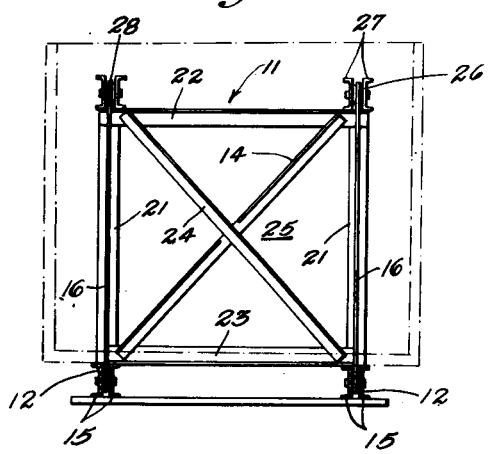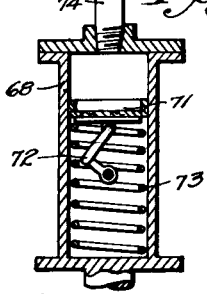

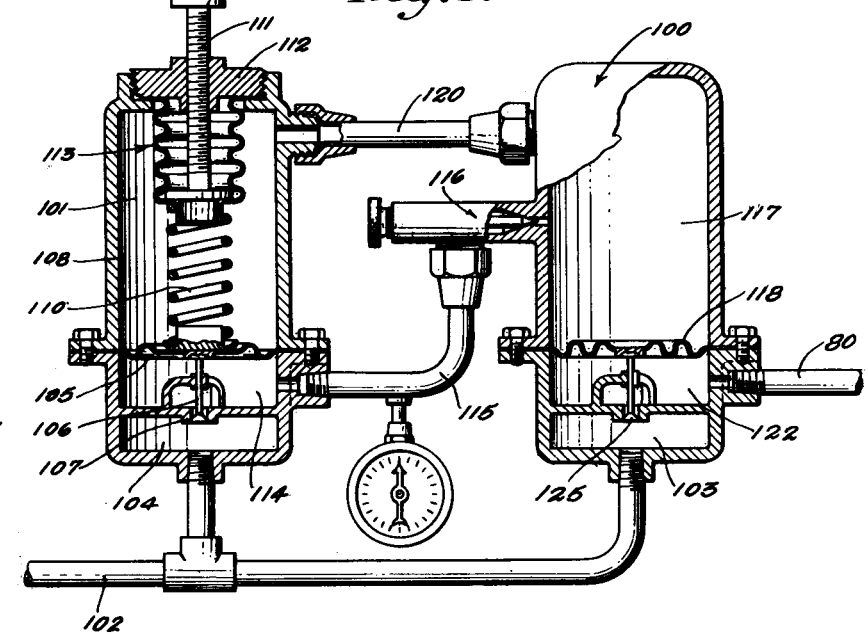
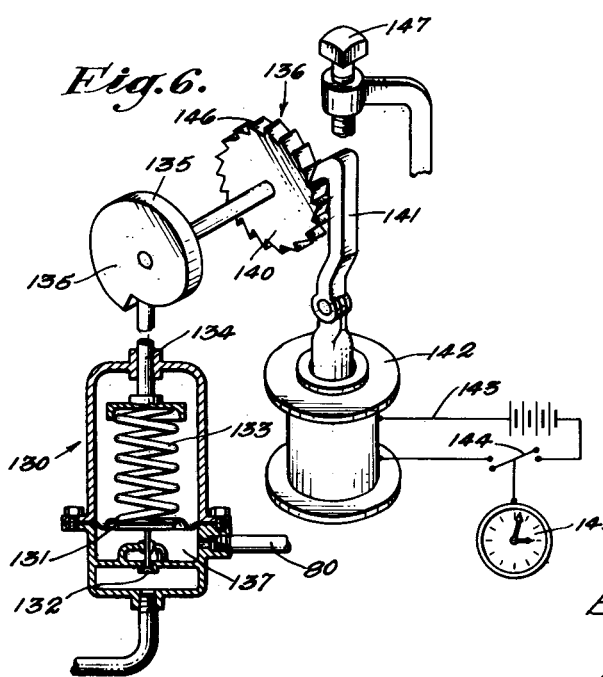

March 5, 1935. R. V. LABARRE 1,993,103
SOIL TESTING APPARATUS
Filed Feb. 29, 1932  4 Sheets-Sheet 4

INVENTOR:
Robert V. Labarre
By
ATTORNEY.

Patented Mar. 5, 1935

1,993,103

UNITED STATES PATENT OFFICE 1,993,103

SOIL TESTING APPARATUS

Robert V. Labarre, Los Angeles, Calif.

Application February 29, 1932, Serial No. 595,846

8 Claims. (Cl. 265—14)

My invention relates to the art of testing soils for the purpose of determining the physical characteristics thereof, and relates particularly to a testing device by which pressure may be applied to soil or earth formations and the action of the soil thereunder scientifically and accurately determined. My invention is of particular utility in the testing of soils preparatory to the construction of buildings or other structures where it is desired to obtain the safe bearing value of the soil and to determine the action of the soil under pressure. By use of my invention very accurate data may be obtained as to the deformation or movement of the soil when pressures are applied thereto and also as to the settling of the soil over extended periods of time. The necessity for determining the foundation value of soils on which structures are to be erected has long been recognized, and engineers have made tests by use of crude methods and crude equipment. One method employed has been to bore a hole in the ground, place a shoe or plate in the bottom thereof, stand a post or pile on the plate, erect a flat table at the upper end of the post and then place weight members, such as sacks filled with sand or earth, on this platform. By measuring the downward movement of the post member, the action of the soil formation under the weight applied is determined with more or less accuracy, depending upon the skill of the tester and the accuracy of the equipment employed. Another equipment which has been extensively used employs a vertical post with a shoe on the bottom thereof for placing in a test hole, and a fulcrumed lever arm on the end of which weights are hung. In the use of both the foregoing devices accurate results are never assured, and the results are therefore considered as only approximations of the soil conditions.

My invention comprehends a device which may be readily transported and by which accurate readings of both the pressure applied to the soil and the deformation of the soil under pressure may be obtained. My new testing device includes a weight member consisting of a demountable structure having platforms on which weights may be placed so as to build up the weight of the weight member to a desired point. In substantially the center of the weight member is an abutment which receives the upper end of a force exerting device, and to the lower end of the force exerting device a pressure foot or shoe is secured. Means for operating the force exerting device are supplied in the form of an air or gas reservoir which is so connected to the cylinder-piston of the force exerting device that the pressure within the pressure cylinder of the force exerting device may be varied in accordance with a preconceived plan. By the use of this equipment the force or weight applied to the pressure shoe may be gradually increased over a period of time or may be increased at predetermined intervals, and the corresponding pressures and soil deformation may be obtained directly from automatic registering devices forming part of the equipment.

It is an object of my invention to provide a soil testing device of simple and demountable construction enabling it to be knocked down and transported on a relatively small truck to any desired point of operation.

A further object of the invention is to provide a soil testing device of this character having weight receiving or weight holding portions disposed on opposite sides of a central chamber in which the force exerting equipment and the recording equipment are placed.

It is an object of the invention to provide in combination with a pressure shoe means for exerting a force against said pressure shoe, together with means for recording the movement of said pressure shoe and the corresponding pressure required to accomplish movement of the pressure shoe.

It is a further object of the invention to incorporate a device for automatically varying the pressure exerted against the pressure shoe over a prescribed period of time, thereby making it possible to set up the testing device, initiate the operation of the mechanism, and to leave the device without attendance until the expiration of the period of time over which the test is to be conducted. The only labor required in the operation of the device is the setting up of the machine at the start of the test and then the dismantling of the machine after the test has been made. No expense for labor during the test is required, this being a very pronounced saving over old methods of soil testing.

Further objects and advantages of the invention will be made evident throughout the following part of the specification.

Referring to the drawings, which are for illustrative purposes only,

Fig. 3 is a fragmentary cross section taken substantially as indicated by the line 3—3 of Fig. 2.

Fig. 4 is a cross section on a plane represented by the line 4—4 of Fig. 1.

Fig. 5 is an enlarged sectional detail showing the automatic controlling device which I prefer to use in the practice of my invention.

Fig. 6 is a diagrammatic view showing an alternative form of automatic controlling device.

Fig. 8 is an enlarged sectional detail showing the fluid pressure responsive device of my invention.

Figure 1:
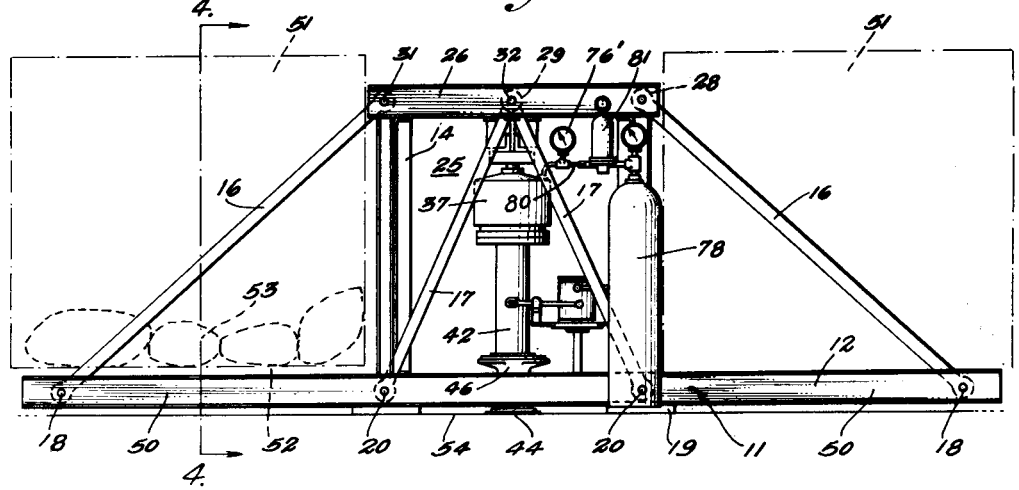
Fig. 1 is a front elevation of a preferred embodiment of my invention.
Figure 2:
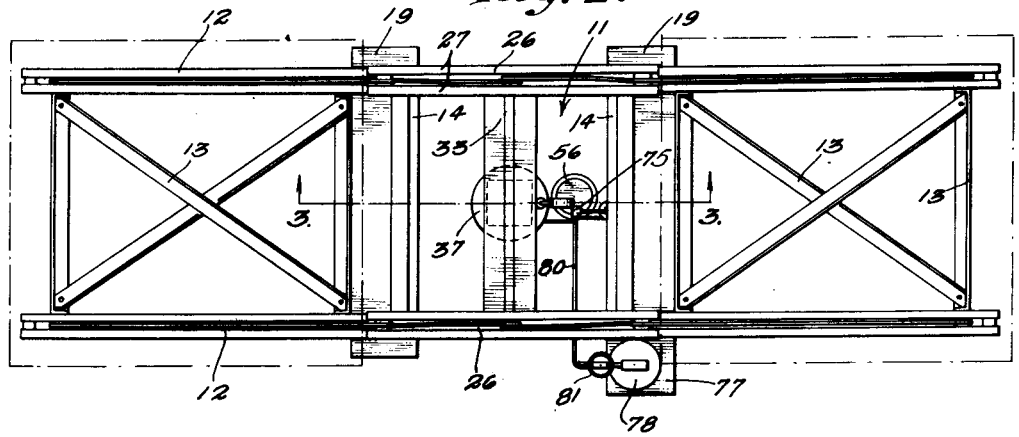
Fig. 2 is a plan view thereof.

As best shown in Figs. 1 to 4, my invention includes a demountable weight member or weight structure 11 consisting of stringers 12 held in spaced relationship by end horizontal frames 13 and vertical frames 14. The stringers 12 rest upon boards 19 and each consists of a pair of structural channels 15 which are spaced apart such distance that the ends of outer and inner tension bars or struts 16 and 17 may be inserted therebetween and secured thereto by removable pins 18 and 20. The vertical frames 14 are substantially square in form and include, as shown in Fig. 4, side posts 21, top and bottom members 22 and 23, and cross braces 24. These vertical frames 14 are spaced in parallel vertical planes on opposite sides of the center line of the structure 11 so as to define in the center of the structure 11 a central space or chamber 25. The frames 14 rest across the stringers 12, and resting on and connecting the upper ends of the frames are girders 26, which, like the stringers 12, are made from structural channels 27 spaced apart so that the upper ends 28 of the tension members 16 may be received between the ends of the cooperating pairs of channels 27, and the upper ends 29 of the tension members 17 may extend between the central parts of the cooperating pairs of channels 27. The ends 28 of the tension members 16 are secured to the girders 26 by removable pins 31, and the upper ends 29 of the tension members 17 are secured to these girders 26 by pins 32. The structure 11, due to the assembly of parts shown, has the form of an inverted truss.

Extending across the upper portion of the space 25 from the center of one girder 26 to the center of the other girder 26 is a thrust or abutment member 33 fabricated in girder form from steel structural members, and on the lower face of the member 33, in substantially its center, is a thrust fitting 34 having a downwardly projecting ball 35 which engages a depression or socket 36 in the upper end of a cylinder 37 forming part of a force exerting means 38 which constitutes a principal part of my invention. Projecting into the lower open end of the cylinder 37 is a piston 40 having a sealing member 41 secured to its upper end and having a thrust member or post 42 extending downwardly from its lower end, this thrust member 42 being a replaceable element and being secured to the piston 40 by screws 43. Immediately below the thrust member 42 is a pressure shoe 44 of desired diameter, and extending between the pressure shoe 44 is an adjustable member or jack 45 consisting of a head 46, a screw 47, and a foot 48.

In assembly of my testing device the weight member is first erected, and the weight thereof is built up by placing boxes or containers 51 on the projecting ends 50 of the stringers 12 so as to provide supporting means on the opposite ends of the weight member or structure 11, in which any relatively heavy material may be placed. For filling the boxes 51 I ordinarily employ earth, sand, or other material which is found at hand. It is to be understood that the boxes 51 are not entirely necessary but are employed for a matter of convenience, as it is possible to merely place boards 52 across the ends 50 of the stringers 12 and to pile sand-filled bags 53 thereon, as shown in Fig. 1. The pressure shoe 44 may then be placed on the ground 54, and the force exerting device 38, which may be considered as including the parts 37, 40, 42, and 45, is then placed on the shoe 44 with the socket 36 in engagement with the ball 35 of the thrust or abutment member 33. The jack 45 is readily adjustable to give the force exerting means 38 the desired length corresponding to the distance from the surface of the ground 54 to the ball 35. The weight of the weight member is then increased by the filling of the boxes 51 or the placing of sand bags 53 to a value in excess of the weight or force to be exerted against the shoe 44. On a cross member 55 extending from one stringer 12 to the other across the lower portion of the central space 25, and in a position to one side of the jack 45, an indicating device 56 is supported by means of a post 57. This indicating device includes a rotatable drum 58 adapted to be rotated at constant speed by clock or timing mechanism located within the drum 58, and on this drum 58 a recording chart 60 is secured. Extending leftwardly or inwardly from the upper end of the post 57 is a bracket 61 to which a deflection indicating arm 62 is pivoted at 63. The deflection indicating arm is slotted at its leftward end 64 to engage a pin or projection 65 mounted on the post 42, and the rightward end of the arm 62 is equipped with stylus means 66 for producing a mark on the chart 60. The indicating arm 62 is so proportioned that the movement of the projection 65 will be properly indicated on the chart 60. Extending rightwardly from the upper end of the post 57 is a bracket 67 which supports a fluid pressure responsive device 68 having a pressure indicating arm 69 equipped with a stylus means 70 for recording on the upper portion of the chart 60 carried by the recording device 56. Within the fluid pressure responsive device 68 is mounted a piston 71 having connected to its lower surface a crank arm 72, which at its free end is connected to the inner end of the indicating arm 69. A spring 73 normally exerts its force of expansion upwardly against the piston 71. Fluid pressure for operating the device 68 is supplied through a pipe 74 which extends from piping 75 which connects with the pressure chamber of the cylinder 37 through an elbow 76 and a fitting carrying a pressure gauge 76'. Fluid under pressure entering the fluid pressure responsive device 68 through pipe 74 actuates the piston 71, crank arm 72, and the indicating arm 69 carrying the stylus 70, so that pressures are recorded on the chart 60. On the forwardly projecting end 77 of one of the supporting boards 19 a gas container 78 is placed, and this gas container is connected to the piping 75 through piping 80 which contains a pressure regulator 81. The apparatus is now assembled in condition for manual operation, and a test may be conducted in the following manner. With the chart 60 placed with its starting point coincident with the stylus means 66 and 70, the recording device is put into operation by starting the timing or clockwork mechanism thereof so as to rotate the drum 58. The pressure regulator 81 is then manipulated to produce a desired initial pressure in the pressure chamber of the cylinder 37 so that the force exerting device 38 then forces downwardly with a predetermined pressure and through the shoe 44 exerts this pressure on a definite area of the ground or soil. At desired intervals the pressure is increased, the record of such pressure increases being marked by the stylus means 70 complementary to the marking thereon of the downward movement of the member 42 by the stylus means 66. In this manner the pressure exerted on the definite area of soil may be increased from minimum to maximum over a period of time, and accurate readings of pressures and deflections may be obtained. For convenience I have shown the shoe 44 resting on the surface of the ground 54, but in the practice of my invention the shoe 44 is placed in a test hole, and a post or thrust member 42 of proper length to reach from the shoe to the piston 40 is employed. Therefore, the testing equipment includes a number of posts of different lengths which may be used individually or joined together, depending upon the depth of the testing hole in which the test of the soil is being conducted.

Figure 7:
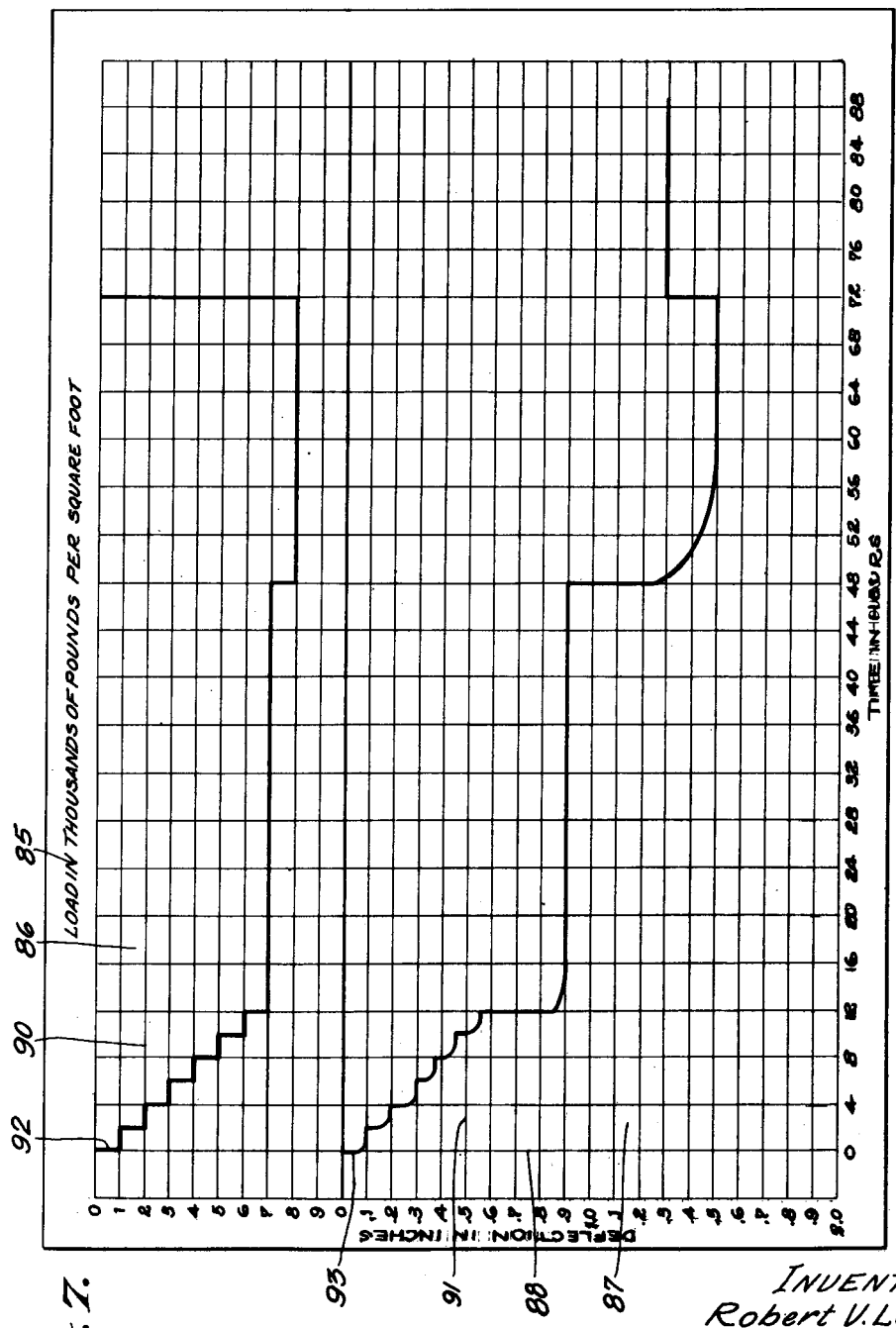
Fig. 7 is an illustration of a chart or record of a test made by use of my invention.

In Fig. 7 I show a typical record chart such as may be obtained in the use of my machine. This chart consists of a paper sheet 85 having an upper, pressure recording chart or graph space 86 and a lower deflection chart 87. Vertical lines 88 extending through both the upper and lower charts 86 and 87 are spaced apart to represent the lapse of time, the spacing of these lines corresponding to the movement of the drum 58 by the timing or clock mechanism employed therewith. Horizontal lines 90 in the upper chart 86, numbered from 1 to 10, represent pressure exerted on the pressure foot in thousands of pounds, and horizontal lines 91 in the lower chart 87 represent deflection of the pressure foot measured in decimals of inches. The sheet 85 is placed on the drum 58 with the zero ordinates coinciding with the stylus members 66 and 70, and the pressure regulator 81 is manually operated to produce desired pressure within the pressure cylinder 37.

In the test indicated by the typical chart shown in Fig. 7, the pressure at the start of the test was increased from zero to 1,000 pounds per square foot on the ground, as indicated by the line or curve 92, this application of a load producing a deflection or compression of the soil of slightly over .1 of an inch, as indicated by that portion of the curve 93 lying on the zero ordinate. The curve 92 shows that the load on the pressure foot was increased 1,000 pounds per square foot at six consecutive two-hour intervals thereafter, thus making the load applied to the pressure foot on the twelfth hour of the test 7,000 pounds per square foot. Following the curve from the ordinate 12, it will be found that the pressure of 7,000 pounds per square foot was maintained until the beginning of the forty-eighth hour of the test, when the load was increased to 8,000 pounds per square foot. At the end of the seventy-first hour of the test, or the beginning of the seventy-second hour, the curve 92 shows that the pressure was entirely removed from the pressure foot. The curve 93 readily shows the movement of the soil, or deflection, under the various loads exerted thereon. For instance, during the application of the first 6,000 pounds of the load the rate of deflection is fairly constant, but when the load was increased from 6,000 to 7,000 pounds per square foot, an increase in deflection occurred from .55 inch to .85 inch, this showing that a critical point in the bearing value of the soil was reached at 7,000 pounds per square foot pressure.

Also, the increase of the load from 7,000 to 8,000 pounds per square foot produced a relatively large deflection. When the pressure was removed at the beginning of the seventy-second hour, the soil showed a rebound or resilience from 1.5 inches to 1.3 inches, or an equivalent of .2 inch. From the data given on this chart it is a simple matter of application of engineering data and computation to determine the practical and safe loading characteristics of the soil tested.

In the simple form of the invention shown in Fig. 1 I have provided a manually operated means for increasing the load applied, but it is to be understood that my invention includes automatic means for increasing the load applied over a prescribed period of time. To obtain the chart shown in Fig. 7, the presence of an operator was required each time the pressure was increased. My preferred form of the invention, having automatic means for increasing the pressure, makes it possible to install the testing equipment, set same in operation, and then leave the equipment without attendance during the time over which the test is to be conducted. In Fig. 5 I show my improved automatic pressure regulator adapted to gradually increase the air pressure in the cylinder 37 between minimum and maximum limits over a prescribed period of time. This automatic equipment includes a fluid operated pressure regulator 100 and an auxiliary pressure regulator 101 connected thereto in such a manner as to gradually increase the pressure controlled by the pressure regulator 100. From the gas container 78 a pipe 102 is connected to the inlet chambers 103 and 104 of the pressure regulating devices 100 and 101. The pressure regulator 101 includes a diaphragm 105 which is connected to a valve member 106 which controls a valve opening 107. A gas-tight cap 108 covers the diaphragm 105 and contains a pressure exerting means in the form of a spring 110, which spring is compressed by an adjusting screw 111 which extends through a sealed cover plate 112 and within a "sylphon" or other sealing means 113. It will be understood that the spring 110 may be compressed so as to cause the valve member 106 to open against a low pressure existing in the outlet chamber 114 of the pressure regulator and that such valve will be held open by the spring until the pressure in the outlet chamber 114 is sufficient to overcome the pressure which the spring 110 exerts downwardly on the diaphragm. The outlet chamber 114 connects through a pipe 115 with a needle valve device 116 which is attached to an air-tight casing 117 secured over the diaphragm 118 of the pressure regulator 100, and an intercommunicating pipe 120 connects between the casing 108 of the pressure regulator 101 and the casing 117 of the pressure regulator 100. In the assembly of parts shown in Fig. 5, the pressure in the casing 117 may be built up gradually from minimum to maximum so as to produce a gradual increase in the pressure existing in the outlet chamber 122 of the pressure regulator 100 and in the pipe 80 which is carried from the outlet chamber 122 and connected to the piping 73. The operation of this automatic mechanism will be understood from the following description: Let it be assumed that the intercommunicating pipe 120 is closed and the interior of the casing 108 is open to atmospheric pressure. Then, the spring 110 may be compressed by the screw 111 to such an extent that a pressure of say 300 pounds will be maintained in the outlet chamber 114 and in the pipe 115. By opening the needle valve device 116 gas under pressure would be allowed to flow into the casing 117, it being understood that the intercommunicating pipe 120 is closed so that no gas could pass therethrough. As the gas entering through the needle valve device 116 accumulates within the casing 117, the pressure exerted against the upper face of the diaphragm 118 is increased, causing the valve 125 connected thereto to control the pressure within the outlet chamber 122 in accordance with the increase in pressure in the casing 117. It will be recognized, however, that the increase in pressure in the outlet chamber 122 and in the casing 117 will not be gradual or constant, for the reason that if the pressure in the pipe 115 is maintained at 300 pounds and the pressure within the casing 117 is gradually increased, the increase of pressure within the casing 117 will react against the flow of gas entering through the needle valve device 116 so as to produce a gradual decrease in the entering flow of gas instead of making it possible to maintain a constant flow. In order to maintain a constant flow of gas into the casing 117, it is necessary that the original difference in pressure between the pipe 115 and the interior casing 117 shall be maintained, or, in the present instance, the pressure in the pipe 115 must be maintained 300 pounds greater than the pressure in the casing 117. This I accomplish in my device by providing the intercommunicating pipe 120 which transmits the pressure existing within the casing 117 to the interior of the casing 108 and against the upper face of the diaphragm 105. Assuming that the spring 110 is compressed so that it will produce a pressure of 300 pounds per square inch in the outlet chamber 114 and the pipe 115 and assuming that the pressure in the casings 108 and 117 is zero, gas will flow through the needle valve device, causing the quantity of air in the casings 108 and 117 to be increased and the fluid pressure within these casings to be accordingly increased. When the pressure in the casings 108 and 117 has reached 1.00 pound per square inch, there will be a gas pressure of 1.00 pound per square inch exerted downwardly on the diaphragm 105, which will operate in addition to the pressure of the spring 110 so as to increase the pressure in the outlet chamber 114 to 301 pounds per square inch, thus maintaining a difference of 300 pounds per square inch between the pressures existing in the pipe 115 and the casing 117; and in view of the fact that this difference in pressure is maintained, the flow of gas through the needle valve into the casing 117 will remain constant. It is possible to regulate the needle valve device 116 to give any desired rate of flow so that the pressure in the casing 117 may be gradually or constantly increased from a desired minimum to a desired maximum over any selected period of time. By use of the pressure controlling device shown in Fig. 5, a load curve, such as the curve 92 on the chart shown in Fig. 7, may be produced in the form of a substantially straight line extending from zero, or other minimum starting point, to 8,000 pounds, or other maximum finishing point. The device may be set in operation and the equipment then left entirely alone throughout the extent of the test period, which may be conducted over any desired length of time.

My invention also includes automatic means for periodically increasing the load applied by the device, and in Fig. 6 I have shown such an automatic means as including a pressure regulator 130 having a diaphragm 131 which is connected to a pressure controlling valve 132. For producing an operating pressure on the upper face of the diaphragm 131 I provide a resilient member in the form of a spring 133 adapted to be compressed through a vertically movable stem 134 which is engaged by a cam 135. This cam is equipped with means 136 for rotating it through proper angles to accomplish the desired increase in pressure of the spring 133. For instance, the cam may be so formed that in a 350° rotation thereof it will produce a compression of the spring 133 sufficient to increase the pressure in the outlet chamber 137 of the regulator 130 from zero to 1,000 pounds per square inch. Then, by a rotation of the cam through 35° or one-tenth its maximum, the pressure existing within the outlet chamber 137 may be increased to 100 pounds per square inch. The means 136 which I have shown for moving the cam 135 consists of a ratchet wheel 140, a pawl 141, and means for reciprocating the pawl 141 having the form of a solenoid 142 which is energized through a circuit 143 having a switch 144 therein which may be periodically closed by a timing mechanism such as indicated by a clock 145. Each time the switch 144 is automatically closed by the timing mechanism 145, the cam 135 will be advanced through an angular distance corresponding to the spacing of the teeth 146 of the ratchet wheel 140. By means of a stop screw 147, the distance of travel of the pawl 141 may be varied so that it will traverse a desired number of teeth 146 of the ratchet wheel 140.

Although I have herein shown my invention in simple and practical form, it is recognized that certain parts or elements thereof are representative of other parts, elements, or mechanisms which may be employed in substantially the same manner to accomplish substantially the same results; therefore, it is to be understood that the invention is not to be limited to the detail disclosed herein but shall be accorded the full scope of the following claims.

I claim as my invention:

1. A device for testing soil at the earth's surface, including: a weight member; a pressure foot adapted for engagement with the soil to be tested; a force exerting device operative between said pressure foot and said weight member; automatic control means for increasing, in accordance with a predetermined plan, the force exerted by said force exerting device; and means indicating the force exerted by said force exerting device.

2. A device for testing soil at the earth's surface, including: a weight member; a pressure foot adapted for engagement with the soil to be tested; a force exerting device operative between said pressure foot and said weight member; automatic control means for increasing, in accordance with a predetermined plan, the force exerted by said force exerting device; means indicating the force exerted by said force exerting device; and means for indicating the movement of said pressure foot in response to the force exerted by said force exerting device.

3. A device for testing soil at the earth's surface, including: a weight member; a pressure foot adapted for engagement with the soil to be tested; a force exerting device operative between said pressure foot and said weight member; a deformation chart; means for moving said deformation chart; a marker set to inscribe said deformation chart; means connecting said marker with said pressure foot so as to move said marker in accordance with the movement of said pressure foot under force exerted by said force exerting device; and automatic control means for increasing, in accordance with a predetermined plan, the force exerted by said force exerting device.

4. A device for testing soil at the earth's surface, including: a weight member; a pressure foot adapted for engagement with the soil to be tested; a force exerting device operative between said pressure foot and said weight member; a deformation chart; means for moving said deformation chart; a marker set to inscribe said deformation chart; means connecting said marker with said pressure foot so as to move said marker in accordance with the movement of said pressure foot under force exerted by said force exerting device; automatic control means for increasing, in accordance with a predetermined plan, the force exerted by said force exerting device; a pressure chart; means for moving said pressure chart; and a marker adapted to indicate on said pressure chart the force exerted by said force exerting device.

5. A device for testing soil at the earth's surface, including: a weight member; a pressure foot adapted for engagement with the soil to be tested; walls forming an expansible chamber member operative between said weight member and said pressure foot; and automatic means for producing predetermined periodical increases in the fluid pressure in said expansible chamber member.

6. A device for testing soil at the earth's surface, including: a weight member comprising a lower horizontal frame member having an opening in the central portion thereof and extending end portions on which weights may be placed, upright members having their lower ends detachably secured to said lower frame member on opposite sides of and adjacent said central opening, and an upper horizontal member detachably secured to the upper ends of said upright members so as to extend over said central opening of said lower frame member; force exerting means having its upper end engaging said upper horizontal member and having its lower portion extending through said central opening of said lower frame member into engagement with the soil to be tested; means indicating the force exerted by said force exerting means; and means for indicating the movement of the lower end of the force exerting means in response to the force exerted by said force exerting means.

7. A device for testing soil at the earth's surface, including: a weight member comprising a lower horizontal frame member having an opening in the central portion thereof and extending end portions on which weights may be placed, upright members having their lower ends detachably secured to said lower frame member on opposite sides of and adjacent said central opening, an upper horizontal member detachably secured to the upper ends of said upright members so as to extend over said central opening of said lower frame member, and diagonal tension struts detachably connecting the upper ends of said upright members to the outer ends of said lower frame member; force exerting means having its upper end engaging said upper horizontal member and having its lower portion extending through said central opening of said lower frame member into engagement with the soil to be tested; means indicating the force exerted by said force exerting device; and means for indicating the movement of the lower end of said force exerting means in response to the force exerted by said force exerting means.

8. A device for testing soil at the earth's surface, including: a weight member comprising a lower horizontal frame member having an opening in the central portion thereof and extending end portions on which weights may be placed, upright members having their lower ends detachably secured to said lower frame member on opposite sides of and adjacent said central opening, an upper horizontal member detachably secured to the upper ends of said upright members so as to extend over said central opening of said lower frame member, diagonal tension struts detachably connecting the central part of said upper horizontal member to the lower ends of said upright members, and diagonal tension struts detachably connecting the upper ends of said upright members to the outer ends of said lower frame member; force exerting means having its upper end engaging said upper horizontal member and having its lower portion extending through said central opening of said lower frame member into engagement with the soil to be tested; means indicating the force exerted by said force exerting means; and means for indicating the movement of the lower end of said force exerting means in response to the force exerted by said force exerting means.

ROBERT V. LABARRE.